United States Patent
Nelson

(10) Patent No.: US 9,704,013 B2
(45) Date of Patent: Jul. 11, 2017

(54) ELECTRONIC DEVICE WITH DISPLAY-BASED FINGERPRINT READER

(71) Applicant: Sony Corporation, Tokyo (JP)

(72) Inventor: Joakim Nelson, Lund (SE)

(73) Assignee: Sony Mobile Communications Inc., Tokyo (JP)

(*) Notice: Subject to any disclaimer, the term of this patent is extended or adjusted under 35 U.S.C. 154(b) by 159 days.

(21) Appl. No.: 14/651,678

(22) PCT Filed: Mar. 21, 2014

(86) PCT No.: PCT/IB2014/060034
§ 371 (c)(1),
(2) Date: Jun. 12, 2015

(87) PCT Pub. No.: WO2015/140600
PCT Pub. Date: Sep. 24, 2015

(65) Prior Publication Data
US 2016/0283772 A1    Sep. 29, 2016

(51) Int. Cl.
*G06K 9/00* (2006.01)
*G06K 7/10* (2006.01)
*G06F 3/042* (2006.01)

(52) U.S. Cl.
CPC ....... *G06K 9/00033* (2013.01); *G06F 3/0421* (2013.01); *G06K 9/00* (2013.01)

(58) Field of Classification Search
USPC ................. 382/124, 321; 345/175, 176, 207; 250/277.14
See application file for complete search history.

(56) References Cited

U.S. PATENT DOCUMENTS

| | | | | |
|---|---|---|---|---|
| 6,633,656 | B1* | 10/2003 | Picard | G06K 9/0002 340/5.53 |
| 8,139,827 | B2* | 3/2012 | Schneider | G01N 29/06 382/123 |
| 9,336,428 | B2* | 5/2016 | Erhart | G06K 9/00026 |
| 9,367,173 | B2* | 6/2016 | Setlak | G06F 3/042 |
| 9,400,911 | B2* | 7/2016 | Erhart | G06F 1/1626 |

(Continued)

FOREIGN PATENT DOCUMENTS

| | | |
|---|---|---|
| EP | 2336859 A1 | 6/2011 |
| WO | 8505477 A1 | 12/1985 |

OTHER PUBLICATIONS

International Search Report and Written Opinion dated Feb. 10, 2015 for corresponding International Application No. PCT/IB2014/060034.

*Primary Examiner* — Kathleen Y Dulaney
(74) *Attorney, Agent, or Firm* — Renner, Otto, Boisselle & Sklar, LLP

(57) ABSTRACT

A display and finger print reader assembly for an electronic device includes a display having an arrangement of light emitting pixels, a light guide juxtaposed the arrangement of pixels of the display, and light sensors disposed at different locations around a periphery of the light guide. Light is sequentially emitted from the pixels to illuminate a user's finger that is placed against the display and finger print reader assembly. The emitted light that is reflected by the user's finger propagates in the light guide to one or more of the light sensors and indicates a fingerprint characteristic of a portion of the user's finger adjacent the pixel or pixels from which the light is emitted.

19 Claims, 2 Drawing Sheets

(56) References Cited

U.S. PATENT DOCUMENTS

| | | | | |
|---|---|---|---|---|
| 9,465,972 B2* | 10/2016 | Chung | | G06K 9/00013 |
| 2006/0279558 A1* | 12/2006 | Van Delden | | G06F 1/13338 |
| | | | | 345/176 |
| 2009/0039241 A1* | 2/2009 | Ueki | | A61B 5/0059 |
| | | | | 250/227.14 |
| 2010/0134735 A1* | 6/2010 | Nakamura | | H01L 31/1055 |
| | | | | 349/116 |
| 2010/0220900 A1* | 9/2010 | Orsley | | G06F 3/0421 |
| | | | | 382/124 |
| 2010/0225607 A1* | 9/2010 | Kim | | G06F 3/042 |
| | | | | 345/173 |
| 2011/0157097 A1* | 6/2011 | Hamada | | G02F 1/13338 |
| | | | | 345/175 |
| 2011/0199338 A1* | 8/2011 | Kim | | G06F 3/0418 |
| | | | | 345/175 |
| 2011/0279414 A1* | 11/2011 | Noma | | G02F 1/1336 |
| | | | | 345/175 |
| 2011/0291993 A1* | 12/2011 | Miyazaki | | G06F 3/042 |
| | | | | 345/175 |
| 2012/0127128 A1* | 5/2012 | Large | | G06F 3/0425 |
| | | | | 345/175 |
| 2012/0242635 A1* | 9/2012 | Erhart | | G06F 1/1626 |
| | | | | 345/207 |
| 2012/0321149 A1* | 12/2012 | Carver | | G06K 9/0004 |
| | | | | 382/124 |
| 2013/0021300 A1* | 1/2013 | Wassvik | | G06F 3/0421 |
| | | | | 345/175 |
| 2013/0051637 A1* | 2/2013 | Kulcke | | G06K 9/0012 |
| | | | | 382/124 |
| 2013/0108124 A1* | 5/2013 | Wickboldt | | G06K 9/00053 |
| | | | | 382/124 |
| 2013/0279769 A1* | 10/2013 | Benkley, III | | G06K 9/00013 |
| | | | | 382/124 |
| 2014/0205160 A1* | 7/2014 | Chang | | H01L 27/14678 |
| | | | | 382/124 |
| 2015/0177884 A1* | 6/2015 | Han | | G06F 3/044 |
| | | | | 345/174 |
| 2015/0189136 A1* | 7/2015 | Chung | | G06K 9/00013 |
| | | | | 348/77 |
| 2015/0277652 A1* | 10/2015 | Kim | | H04M 1/67 |
| | | | | 345/173 |

* cited by examiner

ELECTRONIC DEVICE WITH DISPLAY-BASED FINGERPRINT READER

TECHNICAL FIELD OF THE INVENTION

The technology of the present disclosure relates generally to electronic devices and, more particularly, to an electronic device having a display that is configured to scan a user's fingerprint for use in biometric authentication.

BACKGROUND

Many modern electronic devices employ authentication techniques that involve entry of information by a user, such as a personal identification number (PIN) (e.g., typically a four digit number) or a password (e.g., a series of alphanumeric characters). PIN codes and passwords are difficult to remember, especially after a prolonged period of non-use or recently after changing the code or password. Also, information that is entered using a touch screen interface or a keyboard may be learned and used in an unauthorized manner by another party.

Another authentication approach is to use biometric scanning, such as fingerprint detection. But conventional fingerprint scanners can take up valuable space on the surface of an electronic device. In the case of mobile electronic devices, such as mobile telephones, the incorporation of a fingerprint scanner can take away from an area that could otherwise be used for a display.

SUMMARY

Disclosed is a display assembly for an electronic device that includes fingerprint detection functionality. A portion of the display assembly is used to "light up" the finger and reflections from the finger are detected and used to identify and/or authenticate the user.

According to one aspect of the disclosure, an electronic device includes a display and finger print reader assembly. The display and finger print reader assembly includes a display having an arrangement of light emitting pixels; a light guide juxtaposed the arrangement of pixels of the display; and light sensors disposed at different locations around a periphery of the light guide. Light is sequentially emitted from the pixels to illuminate a user's finger that is placed against the display and finger print reader assembly, the emitted light that is reflected by the user's finger propagates in the light guide to one or more of the light sensors and indicates a fingerprint characteristic of a portion of the user's finger adjacent the pixel or pixels from which the light is emitted.

According to one embodiment of the electronic device, an amount of light that respectively reaches each light sensor indicates local surface contour of the user's finger adjacent the pixel or pixels from which the light is emitted.

According to one embodiment of the electronic device, the sequential emission of light includes emitting light from one pixel at a time.

According to one embodiment of the electronic device, the sequential emission of light includes emitting light from a group of pixels at a time.

According to one embodiment of the electronic device, the reflected light propagates in the light guide by internal reflection.

According to one embodiment of the electronic device, the display and finger print reader assembly further comprises a touch sensitive input, the light guide interposed between the display and the touch sensitive input, the touch sensitive input used to detect a position or angle of the user's finger relative to the display and fingerprint reader during fingerprint detection.

According to one embodiment of the electronic device, pixels that are controlled to emit light during fingerprint detection are pixels associated with a predetermined area of the display.

According to one embodiment of the electronic device, the light sensors are positioned relative to the predetermined area to optimize detection of the reflected light.

According to one embodiment, the electronic device further includes a control circuit that determines a pattern of light representative of the user's fingerprint from output signals from the light sensors.

According to one embodiment of the electronic device, the control circuit compares the pattern of light representative of the user's fingerprint with a baseline pattern of light representative of the user's fingerprint and, if a match is detected between the patterns of light representative of the user's fingerprint, the control circuit carries out an authentication action.

According to another aspect of the disclosure, a method of reading a fingerprint of a user of an electronic device includes sequentially emitting light from pixels of a display; detecting emitted light that reflects from the user's finger and propagates from the user's finger in a light guide juxtaposed with the pixels of the display to light sensors that are disposed at different locations around a periphery of the light guide; and determining a pattern of light representative of the user's fingerprint from output signals from the light sensors.

According to one embodiment, the method further includes detecting a position or angle of the user's finger relative to the display with a touch sensitive input.

According to one embodiment, the method further includes correlating the position or angle of the user's finger with data from the light sensors as part of determining the pattern of light representative of the user's fingerprint.

According to one embodiment of the method, an amount of light that respectively reaches each light sensor indicates local surface contour of the user's finger adjacent the pixel or pixels from which the light is emitted.

According to one embodiment of the method, the sequential emission of light includes one of emitting light from one pixel at a time or emitting light from a group of pixels at a time.

According to one embodiment of the method, the reflected light propagates in the light guide by internal reflection.

According to one embodiment of the method, pixels that are controlled to emit light during fingerprint detection are pixels associated with a predetermined area of the display.

According to one embodiment of the method, the light sensors are positioned relative to the predetermined area to optimize detection of the reflected light.

According to one embodiment, the method further includes comparing the pattern of light representative of the user's fingerprint with a baseline pattern of light representative of the user's fingerprint and, if a match is detected between the patterns of light representative of the user's fingerprint, carrying out an authentication action.

DETAILED DESCRIPTION OF EMBODIMENTS

Figure 1:
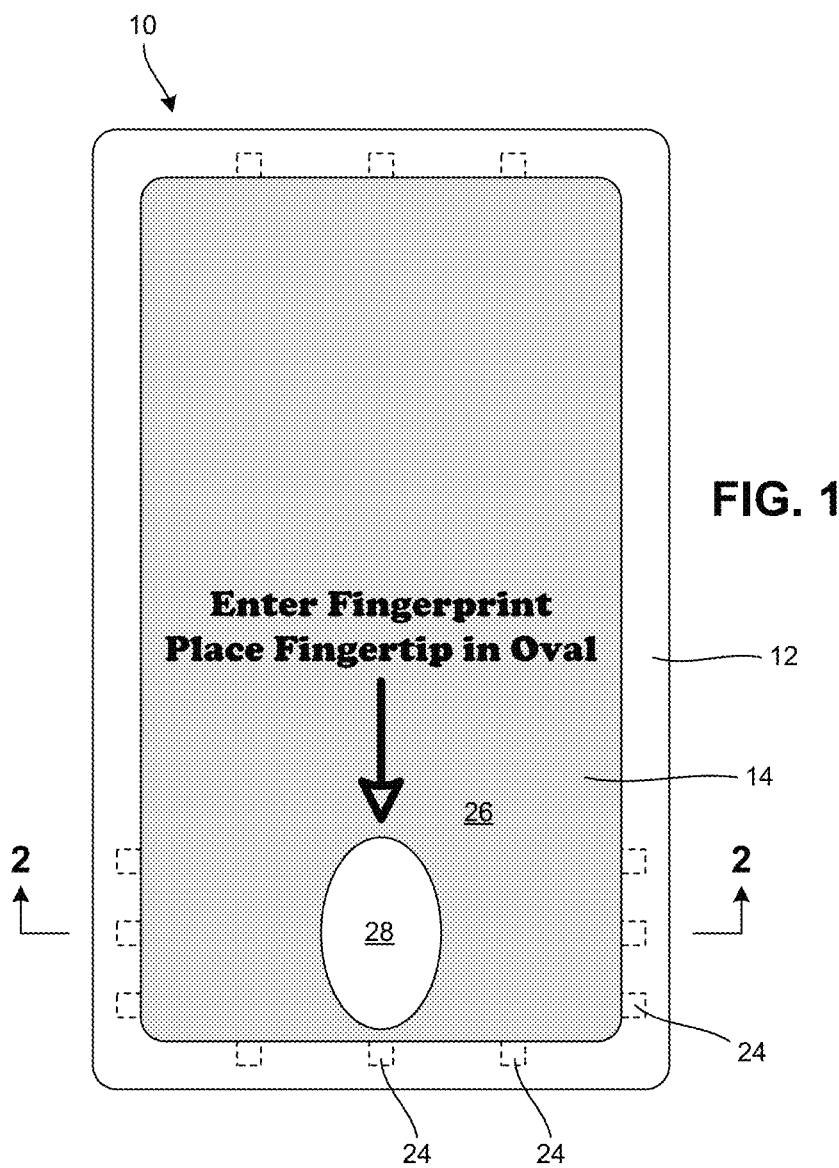
FIG. 1 is a schematic illustration of a front view of an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and method of controlling access to functionality of the electronic device. The electronic device is typically—but not necessarily—a portable electronic device, and may take any form factor including, but not limited to, a mobile telephone, a tablet computing device, a laptop computer, a gaming device, a camera, or a media player. The electronic device shown in the appended figures is a mobile telephone, but applicability of aspects of the invention is not limited to mobile telephones.

In this disclosure, angles concerning the interaction of light with a surface (e.g., angles of incidence, reflection, and refraction and output angles) are measured relative to the normal to the surface.

Figure 2:
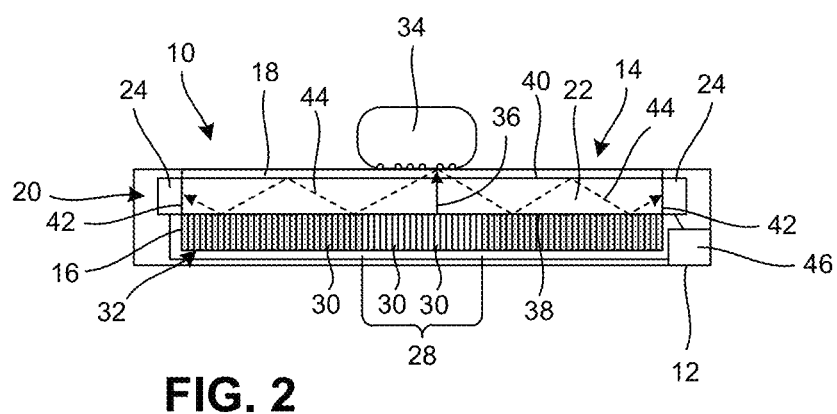
FIG. 2 is a cross-section of the schematic representation of the electronic device taken along the line 2-2 in FIG. 1 and while a user places a fingertip against a display of the electronic device for fingerprint detection.

With initial reference to FIGS. 1 and 2, illustrated is an exemplary electronic device 10. The electronic device 10 includes a housing 12 that retains a display and fingerprint reader assembly 14. The display and fingerprint reader assembly 14 includes a display 16 for outputting visual information to a user. To implement touch screen functionality, the display and fingerprint reader assembly 14 includes a touch sensitive input 18 disposed over the display 16. The touch sensitive input 18 may be, for example, a capacitive touch sensitive input assembly or a resistive touch sensitive input. Interposed between the display 16 and the touch sensitive input 18 is a fingerprint detector assembly 20. The fingerprint detector assembly 20 includes a light guide 22 and light sensors 24 (e.g., photodetectors) that are strategically positioned around the light guide 22. In one embodiment, the light guide 22 is a separate part of the display and fingerprint reader assembly 14 from the display 16 and/or the touch sensitive input 18. In other embodiments, the light guide 22 is part of the display 16 and/or the touch sensitive input 18 (e.g., the light guide 22 is the "top glass" for the display 16).

The electronic device 10 may be configured to seek input from the user in the form of a fingerprint. The fingerprint may be used in various authentication processes, such as unlocking the electronic device 10, authenticating a payment, or gaining access to functionality such as an email account or a secure website. In one embodiment, when fingerprint input is called for, the electronic device 10 may display a graphical user interface 26 to prompt the user to enter a fingerprint by placing the user's fingertip against the display and fingerprint reader assembly 14 in a predetermined area 28. The predetermined area 28 is coordinated with the light sensors 24 to facilitate detection of the user's fingerprint. The user may be guided to place his or her fingertip in the predetermined area 28 by the graphical user interface 26. In the illustrated example, the predetermined area 28 is visually indicated to the user with a white oval where portions of the display 16 outside the predetermined area 28 are displayed in grey. Also, in the illustrated example, the text "Enter Fingerprint Place Fingertip in Oval" and a displayed arrow further guide the user to make the appropriate touching action with the electronic device 10. It will be appreciated that other visual formats and/or content for the graphical user interface 26 are possible.

In one embodiment, the display 16 is a liquid crystal display (LCD). The LCD has cells of liquid crystal, each of which may be controlled individually to emit light or not emit light. As is conventional, the brightness and color of the emitted light from the cells is controlled to display intended visual content on the display 16. In this regard, the display 16 has pixels 30 that are collectively arranged in a pixel array 32 and light output from each pixel 30 may be controlled individually. The density of the pixels 30 in FIG. 2 is for illustrative purposes only and may be much high than shown in the figure.

Some of the pixels 30 are associated with the predetermined area 28. During detection of a fingerprint, the pixels 30 associated with the predetermined area 28 may be illuminated (e.g., turned on or controlled to emit light) and reflections from the user's finger 34 may be sensed with the light sensors 24 and analyzed, as will be described in greater detail below.

Fingerprint detection has two principle phases. The first phase is a scanning phase during which the user's finger 34 is scanned and data is collected with the light sensors 24. The second phase is an analysis phase where the collected data is analyzed to generate a representation of the user's fingerprint and determine if the representation matches a baseline representation of the user's fingerprint. The representations are not necessarily recreations or directly indicative of the actual pattern of ridges in the user's fingerprint. Rather, the representations are patterns of light representative of the user's fingerprint. The pattern of light that is representative of a user's fingerprint may be unique enough to distinguish scan results of an authenticated user from scan results of different persons.

The baseline representation (or baseline representations) may be collected during a configuration routine during which one or more fingerprint samples are collected from the user for later use in this matching process. Matching techniques for fingerprint scanning will be understood by those of skill in the art and will not be described in detail in this disclosure. These techniques or other pattern matching techniques may be applied in this context. If a match is determined, then the electronic device 10 will carry out an authentication action, such as unlocking the electronic device 10, executing a payment via a Internet interface, logging into an account, website or server (e.g., via an application or an Internet interface), etc.

The scanning phase includes illuminating the user's finger 34 with light 36 emitted by one or pixels 30. The light 30 emitted by the pixel(s) 30 is incident on the light guide 22. In one embodiment, the light guide 22 is a solid, light transmissive, right-rectangular parallelepiped having opposed, parallel major surfaces 38, 40 and edges 42 spanning the thickness of the light guide 22 between the major surfaces 38, 40. The light guide 22 may be made from glass, poly(methyl methacrylate) (PMMA), polycarbonate, or other suitable material. The major surfaces of the light guide 22 include a first major surface 38 juxtaposed the display 16 and a second major surface 40 juxtaposed the touch sensitive input 18. In the orientation of the figures, the edges 42 include a left edge, a right edge, a top edge, and a bottom edge. These names for the edges are for descriptive purposes and do not limit the orientation of the electronic device 10 relative to the user or relative to space (e.g., vertical to ground).

In the illustrated embodiment, light 36 emitted by one or pixels 30 during scanning is incident on the lower major surface 38 and enters the light guide 22 by refraction through the first major surface 38. The light 36 then traverses through the thickness of the light guide 22 and becomes incident on the second major surface 40 where it exits the light guide 22, travels through the touch sensitive input 18 and becomes incident on the user's finger 34. Some of the light 36 incident on the user's finger 34 is reflected. At least some of the reflected light travels through the touch sensitive input 18 and enters the light guide 22 via the second major surface 40. This light includes light components (identified by broken line arrows 44) that traverse the thickness of the light guide 22 at an angle greater than the critical angle for total internal reflection at the major surfaces 38, 40. The light components 44 will propagate in the light guide 22 by total internal reflection at the opposed major surfaces 38, 40 until becoming incident on an edge 42 at which the light 44 will typically exit the light 22. It is possible that there may be some light loss (e.g., by localized optical wetting of components or other anomalies) or the reflections are not characterized by the optical principle of total internal reflection. Therefore, the term internal reflection will be used in the description of propagation of the light 44.

Some of the light 44 exiting through edges 42 will become incident on one or more of the light sensors 24. The light sensors 24 that detect reflected light 44 will then output data (e.g., an electrical signal) indicative of the detected light. The data may be input to a control circuit 46 that interprets the data together with data from the other light sensors 24 to generate the representation of the user's fingerprint (e.g., the pattern of light representative of the user's fingerprint).

To improve data collection, the sensors 24 may be strategically located relative to the light guide 22. For example, sensors 24 on the left and right edges of the light guide 22 may be clustered near the bottom edge of the light guide 22. The spacing between sensors 24 on each edge 42, the number of sensors 24 on each edge 42, and the locations of each sensor 24 along each edge 42 each may be varied to improve fingerprint detection results. In the illustrated embodiment, three sensors 24 are located along each edge 42. It will be appreciated that arrangements of sensors 24 different than the illustrated arrangement may be employed.

Different numbers of pixels 30 may be illuminated at one time during the scanning phase in different embodiments. In one embodiment, all of the pixels 30 associated with the predetermined area 28 are illuminated at once during the fingerprint detection. In this embodiment, the data to generate the representation of the user's fingerprint is gathered while the pixels 30 are illuminated.

In another embodiment, the pixels 30 associated with the predetermined area 28 are grouped into blocks of contiguous pixels. The blocks may be in one row arrays of pixels or multi-row arrays of pixels. In this case, the pixels of each block are sequentially illuminated to sequentially illuminate different areas of the user's finger 34, thereby progressively scanning the user's finger 34. Data is collected from the light sensors 24 during the illumination of each block of pixels. The resulting data from the light sensors 24 captured during the illumination of each block is considered collectively in the analysis phase.

In still another embodiment, each pixel 30 associated with the predetermined area 28 is sequentially controlled to emit light. In this case, the pixels are sequentially illuminated to sequentially illuminate different areas of the user's finger 34, thereby progressively scanning the user's finger 34. For instance, pixels in one row of the display 16 are sequentially illuminated, followed by sequential illumination of the pixels in another row, and so on until all pixels from all rows in the predetermined area 28 have been illuminated. Data is collected from the light sensors 24 during the illumination of each pixel. The resulting data from the light sensors 24 captured during the illumination of each pixel 30 is considered collectively for the analysis phase.

Regardless of whether the pixels are illuminated all at once, in blocks or individually, the pixels that are illuminated for the scanning phase may include all pixels in the predetermined area 28. In another embodiment, the touch sensitive input 18 may be used to determine the location of the user's finger 34 relative to the predetermined area 28 of the display and fingerprint reader assembly 14. Once the location of the user's finger 34 is determined, the pixels 30 corresponding to the determined location may be the pixels that are illuminated for the scanning phase (e.g., illuminated all at once, in blocks or individually).

During the analysis phase, registration of the user's finger 34 may be considered to improve fingerprint detection. More specifically, the location and orientation of the user's finger relative to the display and fingerprint reader assembly 14 may be used when interpreting the data from the light sensors 24. For example, the predetermined area 28 may have a longitudinal axis (sometimes referred to as a y-axis) extending parallel to the left and right edges of the light guide 22 and a latitudinal axis (sometimes referred to as an x-axis) extending parallel to the top and bottom edges of the light guide 22. By detecting where the user touches the touch sensitive input 18, a shape and location of the touched area may be determined. The touched area will typically be an irregular oval and will have a longitudinal axis. A tilt angle of the longitudinal axis of the area touched by the user's finger relative to the longitudinal axis and latitudinal axis of the predetermined area may be determined. This tilt angle, along with the location of the touched area, may be used in the analysis phase when generating the representation of the user's fingerprint from the data from the light sensors 24. For instance, the tilt angle and the location of the user's finger may be correlated with the data from the light sensors 24 to improve interpretation of the data.

In one embodiment, the longitudinal axis of the predetermined area 28 need not extend parallel to the left and right edges of the light guide 22 and the latitudinal axis of the predetermined area 28 need not extend parallel to the top and bottom edges of the light guide 22. In this embodiment, the longitudinal and latitudinal axes of predetermined area 28 may be tilted relative to the edges of the light guide 22 for ergonomic reasons or to improve ease of use for the user.

The analysis uses differences in the surface contour of the user's finger 34 and resulting pattern of light representative of the user's fingerprint. The ridges found on the skin of the user's fingertip typically define the user's fingerprint. The skin's peaks and valleys (shown in exaggerated form in FIG. 2) that form the ridges will reflect light differently. This may be at least in part due to the presence of air in the valleys and that the index of refraction for air is different than the index of refraction for skin. These differences in reflection cause by the ridges are represented in the light 44 that reaches the light sensors 24, even though the incident light 36 will be somewhat scattered as the light 36 is reflected off of the user's skin.

For instance, the amount of light that respectively reaches each light sensor 24 for the illumination of one pixel or a small group of pixels may indicate the local surface contour of the user's finger adjacent the illuminated pixel(s) 30, such as whether light 36 is incident on a peak or a valley and the orientation of the peak or valley relative to the longitudinal axis or the latitudinal axis of the predetermined area 28. With successive illumination of different parts of the user's finger 34, a map of the surface contour of the user's finger 34 may be generated. Therefore, the data output by the light sensors 24 contains information regarding the arrangement of ridges on the skin of the user's fingertip.

This data is analyzed to determine the representation of the user's fingerprint (e.g., the pattern of light representative of the user's fingerprint) that may be compared to one or more baseline representations of the user's fingerprint (e.g., one or more baseline patterns of light representative of the user's fingerprint) for authentication purposes. It is predicted that fingerprint analysis will improve with increases in resolution of the pixels 30 of the display 16. In one embodiment, a display 16 with resolution of 1080p is employed. Additionally, it is predicted that fingerprint analysis will be improved when the scanning is performed by illuminating one pixel at a time or scanning is performed by illuminating small groups of pixels (e.g., ten or fewer pixels) at a time to perform an x/y-axis scan of the user's finger 34 and, over time, generate the pattern of light representative of the user's fingerprint. In one embodiment, given enough data and processing of the data, it may be possible to generate a map of the surface contour of the user's finger 34 that is directly indicative of the actual pattern of ridges in the user's fingerprint.

Figure 3:
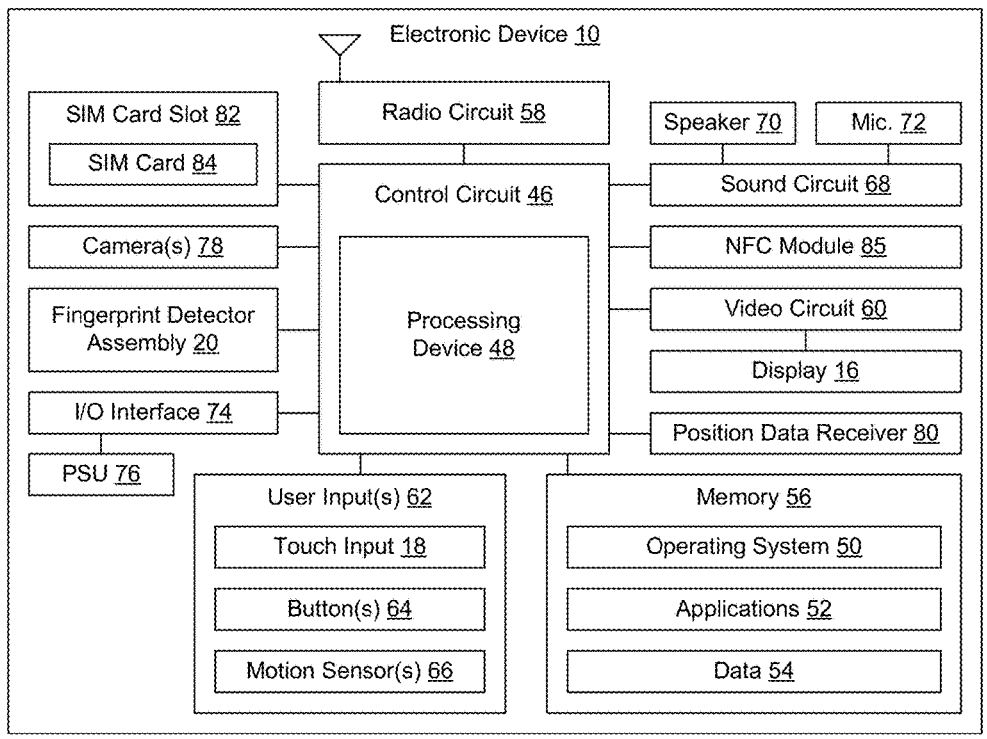
FIG. 3 is a block diagram of the electronic device.

With additional reference to FIG. 3, a schematic block diagram of the electronic device 10 in its exemplary form as a mobile telephone is illustrated. The electronic device 10 includes a control circuit 46 that is responsible for overall operation of the electronic device 10, including controlling fingerprint scanning and user authentication. The control circuit 46 includes a processor 48 that executes an operating system 50 and various applications 52. Typically, control over the fingerprint scanning and user authentication is embodied as part of the operating system 50. In other embodiments, this functionality may be embodied as a dedicated application.

The operating system 50, the applications 52, and stored data 54 (e.g., data associated with the operating system 50, the applications 52, and user files), are stored on a memory 56. The operating system 50 and applications 52 are embodied in the form of executable logic routines (e.g., lines of code, software programs, etc.) that are stored on a non-transitory computer readable medium (e.g., the memory 56) of the electronic device 10 and are executed by the control circuit 46. The described fingerprint scanning and user authentication operations may be thought of as a method that is carried out by the electronic device 10.

The processor 48 of the control circuit 46 may be a central processing unit (CPU), microcontroller, or microprocessor. The processor 48 executes code stored in a memory (not shown) within the control circuit 46 and/or in a separate memory, such as the memory 56, in order to carry out operation of the electronic device 10. The memory 56 may be, for example, one or more of a buffer, a flash memory, a hard drive, a removable media, a volatile memory, a non-volatile memory, a random access memory (RAM), or other suitable device. In a typical arrangement, the memory 56 includes a non-volatile memory for long term data storage and a volatile memory that functions as system memory for the control circuit 46. The memory 56 may exchange data with the control circuit 46 over a data bus. Accompanying control lines and an address bus between the memory 56 and the control circuit 46 also may be present. The memory 56 is considered a non-transitory computer readable medium.

The electronic device 10 includes communications circuitry that enables the electronic device 10 to establish various wireless communication connections. In the exemplary embodiment, the communications circuitry includes a radio circuit 58. The radio circuit 58 includes one or more radio frequency transceivers and an antenna assembly (or assemblies). In the case that the electronic device 10 is a multi-mode device capable of communicating using more than one standard and/or over more than one radio frequency band, the radio circuit 58 represents one or more than one radio transceiver, one or more than one antenna, tuners, impedance matching circuits, and any other components needed for the various supported frequency bands and radio access technologies. The radio circuit 58 further represents any radio transceivers and antennas used for local wireless communications directly with another electronic device, such as over a Bluetooth interface.

The electronic device 10 further includes the display 16 for displaying information to a user. The display 16 may be coupled to the control circuit 46 by a video circuit 60 that converts video data to a video signal used to drive the display 16. The video circuit 60 may include any appropriate buffers, decoders, video data processors and so forth.

The electronic device 10 may include one or more user inputs 62 for receiving user input for controlling operation of the electronic device 10. Exemplary user inputs include, but are not limited to, the touch sensitive input 18 that overlays or is part of the display 16 for touch screen functionality, one or more buttons 64, motion sensors 66 (e.g., gyro sensors, accelerometers), and so forth.

The electronic device 10 may further include a sound circuit 68 for processing audio signals. Coupled to the sound circuit 68 are a speaker 70 and a microphone 72 that enable audio operations that are carried out with the electronic device 10 (e.g., conduct telephone calls, output sound, capture audio for videos, etc.). The sound circuit 68 may include any appropriate buffers, encoders, decoders, amplifiers and so forth.

The electronic device 10 may further include one or more input/output (I/O) interface(s) 74. The I/O interface(s) 74 may be in the form of typical electronic device I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 74 and power to charge a battery of a power supply unit (PSU) 76 within the electronic device 10 may be received over the I/O interface(s) 74. The PSU 76 may supply power to operate the electronic device 10 in the absence of an external power source.

The electronic device 10 also may include various other components. As an example, one or more cameras 78 may be present for taking photographs or video, or for use in video telephony. As another example, a position data receiver 80, such as a global positioning system (GPS) receiver, may be present to assist in determining the location of the electronic device 10. The electronic device 10 also may include a subscriber identity module (SIM) card slot 82 in which a SIM card 84 is received. The slot 82 includes any appropriate connectors and interface hardware to establish an operative connection between the electronic device 10 and the SIM card 84.

The electronic device 10 also may include a near field communication (NFC) module 85 that is used for conducting near field communications. In one embodiment, fingerprint authentication using the above-described techniques may be used in conjunction with near field communications as part of a mobile payment process.

Figure 4:
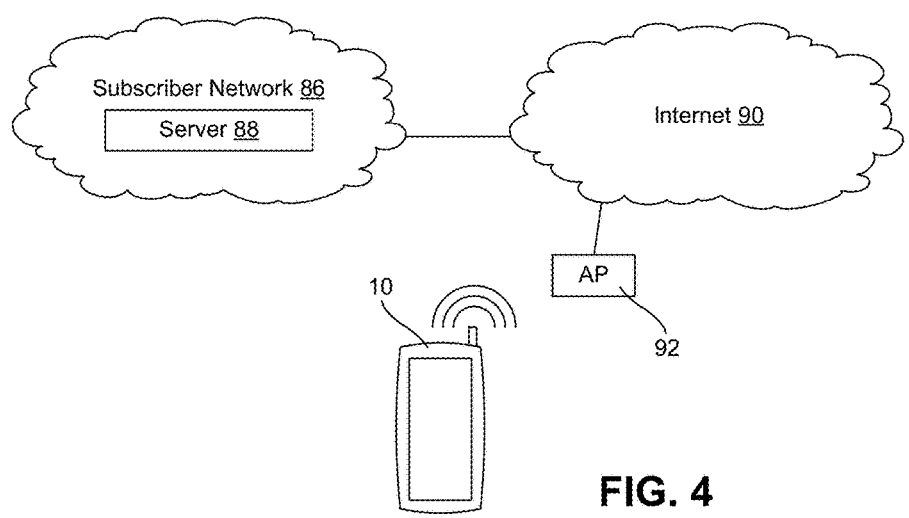
FIG. 4 is a schematic view of a communication environment for the electronic device.

Referring to FIG. 4, schematically shown is a communications environment for the electronic device 10. In the communications environment, the electronic device 10 may carry out wireless communications. To conduct wireless communications, the electronic device 10 establishes network connectivity with one or more networks. Typically, the connection is made to a subscriber network 86 that services the physical geo-location of the electronic device 10. The network 86 may provide Internet access to the electronic device 10. In most cases, the network 86 is a cellular network operated by a respective cellular service telephone company. Exemplary network access technologies for the network 86 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards.

The network 86 supports communications such as, but not limited to, voice communications (e.g., telephone calls), video communications (e.g., video telephony), messaging (e.g., instant messaging, text and multimedia messaging, and electronic mail messaging), data transfers, and Internet browsing. To support the communications activity of the electronic device 10, the network 86 may include a server 88 (or servers). The server 88 may be configured as a typical computer system used to carry out server functions and may include a processor configured to execute software containing logical instructions that embody the functions of the server 88 and a memory to store such software and related data.

The communications between the electronic device 10 and the subscriber network 86 may be established by way of a transmission medium (not specifically illustrated) of the subscriber network 86. The transmission medium may be any appropriate device or assembly, but is typically an arrangement of communications base stations (e.g., cellular service towers, also referred to as "cell" towers).

In some situations, the electronic device 10 may communicate with the Internet 90 via an access point 92 of a local area network (LAN) using a packet-switched protocol, such as IEEE 802.11a, IEEE 802.11b, IEEE 802.11g or IEEE 802.11n (commonly referred to as WiFi). Other LAN-based protocols are possible, such as WiMax under IEEE 802.16. The access point 92 is typically, but not necessarily, a wireless router.

Although certain embodiments have been shown and described, it is understood that equivalents and modifications falling within the scope of the appended claims will occur to others who are skilled in the art upon the reading and understanding of this specification.

What is claimed is:

1. An electronic device, comprising a display device and finger print reader assembly, the display device and finger print reader assembly comprising:

a display having an arrangement of light emitting pixels;
a light guide juxtaposed the arrangement of pixels of the display; and
light sensors disposed at different locations around a periphery of the light guide; and
wherein light is sequentially emitted from the light emitting pixels to illuminate a user's finger that is placed against the display and finger print reader assembly, the emitted light that is reflected by the user's finger propagates in the light guide to one or more of the light sensors and indicates a fingerprint characteristic of a portion of the user's finger adjacent a pixel or pixels from which the light is emitted.

2. The electronic device of claim 1, wherein an amount of light that respectively reaches each light sensor indicates local surface contour of the user's finger adjacent the pixel or pixels from which the light is emitted.

3. The electronic device of claim 1, wherein the sequential emission of light includes emitting light from one pixel at a time.

4. The electronic device of claim 1, wherein the sequential emission of light includes emitting light from a group of pixels at a time.

5. The electronic device of claim 1, wherein the emitted light that is reflected propagates in the light guide by internal reflection.

6. The electronic device of claim 1, wherein the display and finger print reader assembly further comprises a touch sensitive input, the light guide interposed between the display and the touch sensitive input, the touch sensitive input used to detect a position or angle of the user's finger relative to the display and fingerprint reader during fingerprint detection.

7. The electronic device of claim 1, wherein pixels that are controlled to emit light during fingerprint detection are pixels associated with a predetermined area of the display.

8. The electronic device of claim 7, wherein the light sensors are positioned relative to the predetermined area to optimize detection of the emitted light that is reflected.

9. The electronic device of claim 1, further comprising a control circuit that determines a pattern of light representative of a user's fingerprint from output signals from the light sensors.

10. The electronic device of claim 9, wherein the control circuit compares the pattern of light representative of the user's fingerprint with a baseline pattern of light representative of the user's fingerprint and, if a match is detected between the patterns of light representative of the user's fingerprint, the control circuit carries out an authentication action.

11. A method of reading a fingerprint of a user of an electronic device, comprising:

sequentially emitting light from pixels of a display;
detecting emitted light that reflects from the user's finger and propagates from the user's finger in a light guide juxtaposed with the pixels of the display to light sensors that are disposed at different locations around a periphery of the light guide; and
determining a pattern of light representative of the user's fingerprint from output signals from the light sensors.

12. The method of claim 11, further comprising detecting a position or angle of the user's finger relative to the display with a touch sensitive input.

13. The method of claim 12, further comprising correlating the position or angle of the user's finger with data from the light sensors as part of determining the pattern of light representative of the user's fingerprint.

14. The method of claim 11, wherein an amount of light that respectively reaches each light sensor indicates local surface contour of the user's finger adjacent a pixel or pixels from which the light is emitted.

15. The method of claim 11, wherein the sequential emission of light includes one of emitting light from one pixel at a time or emitting light from a group of pixels at a time.

16. The method of claim 11, wherein the emitted light that is reflected propagates in the light guide by internal reflection.

17. The method of claim 11, wherein pixels that are controlled to emit light during fingerprint detection are pixels associated with a predetermined area of the display.

18. The method of claim 17, wherein the light sensors are positioned relative to the predetermined area to optimize detection of the emitted light that is reflected.

19. The method of claim 11, further comprising comparing the pattern of light representative of the user's fingerprint with a baseline pattern of light representative of the user's fingerprint and, if a match is detected between the patterns of light representative of the user's fingerprint, carrying out an authentication action.

\* \* \* \* \*